United States Patent
Coscia (10) Patent No.: US 11,906,247 B2
(45) Date of Patent: Feb. 20, 2024

(54) REFORMER FURNACE FOR PERFORMING AN ENDOTHERMIC PROCESS

(71) Applicant: L'Air Liquide, Société Anonyme pour l'Etude et l'Exploitation des Procédés Georges Claude, Paris (FR)

(72) Inventor: Antonio Coscia, Hadamar (DE)

(73) Assignee: L'Air Liquide, Société Anonyme pour l'Etude et l'Expoitation des Procédés Georges Claude, Paris (FR)

( * ) Notice: Subject to any disclaimer, the term of this patent is extended or adjusted under 35 U.S.C. 154(b) by 294 days.

(21) Appl. No.: 17/097,278

(22) Filed: Nov. 13, 2020

(65) Prior Publication Data
US 2021/0140712 A1    May 13, 2021

(30) Foreign Application Priority Data

Nov. 13, 2019    (EP) .................................... 19020633

(51) Int. Cl.
*F27D 7/02* (2006.01)
*B01J 8/06* (2006.01)
(Continued)

(52) U.S. Cl.
CPC ................ *F27D 7/02* (2013.01); *B01J 8/062* (2013.01); *F23C 5/08* (2013.01); *F23C 13/00* (2013.01);
(Continued)

(58) Field of Classification Search
CPC .. F23C 13/00; F23C 5/08; F23C 2900/03002; C01B 3/384; C01B 2203/0811;
(Continued)

(56) References Cited

U.S. PATENT DOCUMENTS 3,768,980 A * 10/1973 Andersen ................. C10G 9/20
422/204
2011/0011060 A1 * 1/2011 McCarthy, Jr. ....... F01N 3/2033
60/274
(Continued)

FOREIGN PATENT DOCUMENTS

DE    202015105494 U1 * 12/2015 ............. C01B 3/384
EP    3 153 465            4/2017
(Continued)

OTHER PUBLICATIONS

European Search Report for corresponding EP 19029633, dated Apr. 22, 2020.

*Primary Examiner* — Steven B McAllister
*Assistant Examiner* — John E Bargero
(74) *Attorney, Agent, or Firm* — Elwood L. Haynes (57) ABSTRACT

A reformer furnace having a reaction space formed with reaction tubes, a firing space fitted with burners and a flue gas channel in fluid connection with the firing space. The burners are arranged at a first end face of the reformer furnace and produce flames oriented towards a second end face to fire the reaction tubes. The flue gas channel has a transition region and a withdrawal region, wherein the flue gas channel is connected to the second end face of the firing space via the transition region and the transition region of the flue gas channel has a reduced channel diameter compared to the withdrawal region of the flue gas channel. The transition region has a constriction relative to the withdrawal region which results in a hydraulic decoupling between the firing space and the withdrawal region of the flue gas channel.

12 Claims, 3 Drawing Sheets

(51) Int. Cl.
   *F23C 5/08*      (2006.01)
   *F23C 13/00*     (2006.01)
(52) U.S. Cl.
   CPC ............... *F23C 2900/03002* (2013.01); *F27D 2007/023* (2013.01)
(58) Field of Classification Search
   CPC ...... C01B 2203/1023; C01B 2203/1058; B01J 8/062; B01J 2208/00548; B01J 2208/00504; F23J 11/02; F27D 7/02; F27D 2007/023
   USPC ........................................................ 432/120
   See application file for complete search history.

(56)           References Cited
              U.S. PATENT DOCUMENTS

| | | |
|---|---|---|
| 2014/0314631 A1 | 10/2014 | Meissner et al. |
| 2018/0296998 A1 | 10/2018 | Coscia |

FOREIGN PATENT DOCUMENTS

| | | |
|---|---|---|
| GB | 1 192 688 | 7/1968 |
| WO | WO 2013 087194 | 6/2013 |

* cited by examiner

REFORMER FURNACE FOR PERFORMING AN ENDOTHERMIC PROCESS

CROSS REFERENCE TO RELATED APPLICATIONS

This application claims the benefit of priority under 35 U.S.C. § 119 (a) and (b) to European Patent Application No. 19020633.4, filed Nov. 13, 2019, the entire contents of which are incorporated herein by reference.

BACKGROUND

Technical Field of the Invention

The invention relates to a reformer furnace for performing an endothermic process. The invention further relates to the use of the reformer furnace according to the invention for producing synthesis gas from a carbon-containing input material.

Prior Art

Reformer furnaces for catalytic reforming of carbon-containing input materials with steam are known in a multiplicity of embodiments. A well-known example of a reformer furnace for catalytic reforming of carbon-containing input materials is the steam reformer for reforming natural gas and steam to produce synthesis gas, a mixture of carbon monoxide and hydrogen and often also undesired concomitants such as for example carbon dioxide. Such reforming processes proceed endothermically and slowly and conversion of the carbon-containing input material with steam therefore requires an external firing source for heating the catalyst-filled reaction tubes of the reformer furnace.

In the case of large industrial scale plants, a configuration employing a substantially box-shaped furnace with vertical reaction tubes has become established. The interior of the sum of the reaction tubes forms the reaction space of the reformer furnace. The reaction tubes are arranged in one or more parallel rows.

Each reaction tube row is typically fired by two burner rows, wherein one reaction tube row is arranged centrally between two burner rows running parallel to the reaction tube rows, to ensure uniform firing of the reaction tubes. Wall-adjacent burner rows are distinguished from non-wall-adjacent burner rows. For the wall-adjacent burner rows the burners are arranged between a wall of the reformer furnace and a reaction tube row. For a non-wall-adjacent burner row the burners are arranged between two reaction tube rows.

The burners are arranged inside the so-called firing space of the reformer furnace. The reaction gas supplying to, and the product gas discharging from, the reaction tubes is necessarily affected outside the combustion space and the walls of the reaction tubes therefore define the spatial separation between the reaction space and the firing space.

The burners of the burner rows are supplied with air and combustion gas via feed conduits and in the most common designs are arranged either in the ceiling or in the floor of the reformer furnace, wherein the flames of the burners are correspondingly oriented vertically downward towards the reformer furnace floor or oriented vertically upward towards the reformer furnace ceiling, Other arrangements of the burners, for example at the lateral walls of the reformer furnace for lateral firing, or a terraced arrangement for diagonal firing are likewise known but are less frequently employed.

The product gas exiting the reaction tubes is combined in collector conduits outside the firing space and withdrawn. The gas exit temperatures are 800° C. to 900° C. or more. The temperatures in the firing space of the reformer furnace are 1000° C. to 1200° C. or more. The walls of the reformer furnace are accordingly lined with a refractory protective coating.

Withdrawal of flue gases produced by the burners employs so-called flue gas tunnels which are in fluid connection with the firing space of the reformer furnace. The flue gas tunnels are arranged either inside the firing space or outside, spatially separate from the firing space. Depending on the size of the reformer furnace, said furnace has one or more flue gas tunnels. The flue gas tunnels are arranged vertically with respect to the reaction tubes and substantially horizontally with respect to the ceiling and to the floor of the reformer furnace, and also parallel to the burner rows.

A typical reformer furnace configured as a steam reformer for producing synthesis gas is described for example in EP 3 153 465 A1. The flue gas channels are here arranged below the firing space and outside and spatially separate from the firing space and exhibit a wedge-shaped longitudinal profile widening in the flow direction of the burner offgases. Since the flue gas tunnels are only open on one side for withdrawal of the burner offgases, this configuration accounts for the offgas amount cumulatively increasing over the length of the offgas channels. In addition, the openings between the flue gas channels and the firing space may exhibit a wedge profile narrowing in the flow direction, uninterrupted over the entire channel length, to facilitate withdrawal of the offgas amount increasing in the direction of the flue gas channel opening. This allows a uniform flow in the flue gas channel, i.e. the flow rate of the flue gas is ideally constant at any point in the flue gas channel. Uniform flow in the flue gas channel results in an improved temperature distribution in the firing space and thus in a more uniform heating of the furnace tubes. This avoids temperature peaks, thus also making it possible to control the amount of undesired by-products in the reaction of carbon-containing input materials with steam.

The disadvantage of this solution is the high construction cost and complexity associated with the configuration of the wedge-shaped flue gas channel and/or the openings between the flue gas channel and the firing space.

EP 2 791 052 B1 discloses a transportable reformer wherein the flue gas tunnels are fixedly connected to the firing space and in cross section are U-shaped, V-shaped or trapezoidal. The flue gas tunnels are arranged such that the openings are oriented upwards in order that the flue gas formed in the firing space may flow into the flue gas tunnel, wherein the openings are covered by a cover slab provided with means of flue gas entry. The means of flue gas entry in the cover slabs is selected from types of slots, holes, swirl plates, or gaps between the cover slabs.

The disadvantage of this solution is the costly and inconvenient use of additional internals such as cover slabs. The distance between the flue gas tunnel-side end of the firing space and the flue gas tunnel itself is moreover defined merely by the cover slabs provided with slots, holes, swirl plates or gaps. Accordingly, the firing space and the flue gas channel are not hydraulically decoupled from one another, thus resulting in a nonuniform flow of burner offgases in the flue gas channels. This leads to the abovementioned problems, especially nonuniform firing of the reaction tubes. The cover slabs are moreover typically fabricated from a porous material which additionally ensures that no hydraulic decoupling between the firing space and the flue gas channel is achieved since the porous material of the cover slabs does not represent a real pressure barrier for the burner offgases.

SUMMARY

The present invention has for its object to at least partially overcome the abovementioned disadvantages of the prior art.

It is especially an object of the present invention to make the flow of the burner offgases in the flue gas channels of the reformer furnace as uniform as possible while simultaneously making the constructional configuration of the flue gas channels as simple as possible.

It is a further object of the present invention to configure the flue gas channel or the flue gas channels in conjunction with the firing space in such a way as to ensure the most uniform possible firing of the reaction tubes by the burners.

The independent claims provide a contribution to the at least partial achievement of at least one of the abovementioned objects. The dependent claims provide preferred embodiments which contribute to the at least partial achievement of at least one of the objects. Preferred embodiments of constituents of a category according to the invention are, where relevant, likewise preferred for identically named or corresponding constituents of a respective other category according to the invention.

The terms "having", "comprising" or "containing" etc. do not preclude the possible presence of further elements, ingredients etc. The indefinite article "a" does not preclude the possible presence of a plurality.

The objects of the present invention are at least partially solved by a reformer furnace for performing an endothermic process, comprising a reaction space, a firing space and a flue gas channel in fluid connection with the firing space; wherein the reaction space is formed by a plurality of vertically arranged reaction tubes passing through the firing space, wherein the reaction tubes comprise in the tube interior a catalyst for converting a gaseous input material, wherein the reaction tubes are arranged in line and form one or more reaction tube rows; and wherein the firing space is formed by a plurality of refractory walls, comprises a first end face and a second end face and comprises a plurality of burners arranged at the first end face which produce flames oriented in the direction of the second end face, wherein the burners are arranged in line and form a plurality of burner rows, wherein a burner row for firing the reaction tubes is arranged parallel to a reaction tube row; and wherein the flue gas channel for withdrawing burner offgases is arranged in the region of the second end face of the firing space and runs parallel to the burner rows and outside the firing space. According to the invention it is provided that the flue gas channel has a transition region and a withdrawal region, wherein the flue gas channel is connected to the second end face of the firing space via the transition region and the transition region of the flue gas channel has a reduced channel diameter compared to the withdrawal region of the flue gas channel.

The transition region and the withdrawal region are preferably directly connected to one another.

In the context of the subject matter of the invention the terms "channel diameter" or "diameter" when recited in connection with dimensions of the transition region or withdrawal region of the flue gas channel are to be understood as meaning the width of the flue gas channel at the point in question upon viewing the cross section of the flue gas channel at the point in question with regard to the region through which the burner offgases flow (internal diameter).

The transition region of the flue gas channel has a reduced channel diameter compared to the withdrawal region of the flue gas channel.

According to the invention the flue gas channel comprises a transition region and a withdrawal region, wherein the transition region has a smaller channel diameter compared to the withdrawal region and thus produces a constriction between the firing space and the withdrawal region of the flue gas channel. The burner offgases produced by the burners in the region of the first end face of the firing space are passed in the direction of the second end face of the firing space, subsequently pass through the constricted transition region of the flue gas channel and are then passed into the withdrawal region of the flue gas channel. The flue gas channel typically only has an opening on one of its ends from which the burner offgases are withdrawn and may be sent for further use, for example an energy recovery for steam generation. Since in such a case the burner offgases are withdrawn from only one side, this is referred to as asymmetrical withdrawal A preferred embodiment of the reformer furnace according to the invention is characterized in that the ratio of the channel diameter of the transition region to the channel diameter of the withdrawal region is 1:2 to 1:10, preferably 1:5 to 1:7 and particularly preferably 1:6.

A preferred embodiment of the reformer furnace according to the invention is characterized in that the smallest channel diameter of the transition region is smaller than the largest channel diameter of the withdrawal region. The transition region accordingly comprises a smaller channel diameter than the channel diameter at the widest point of the withdrawal region at at least one point.

In the case of constructional configurations of the transition region and/or of the withdrawal region of the flue gas channel diverging from uniform geometric basic shapes, the effect according to the invention is brought about especially when the abovementioned condition is met. The withdrawal region may have a multiplicity of different channel diameters for example when its basic shape does not correspond to a rectangle but rather corresponds to a trapezium or a U-shape, for example. The widest channel diameter of the withdrawal region is used as a basis here. Correspondingly, in the case of the transition region the narrowest channel diameter is used as a basis when said region has the shape of a double cone for example.

The channel diameter of the transition region is thus especially the diameter at the narrowest point of the transition region. The channel diameter of the withdrawal region is moreover especially thus the diameter at the widest point of the withdrawal region. In particular the channel diameter at the narrowest point of the transition region is a factor of at least 2 and at most 10 smaller than the channel diameter at the widest point of the withdrawal region, preferably a factor of at least 5 and at most 7 smaller, particularly preferably a factor of 6 smaller.

The constriction in the flue gas channel, i.e. the transition region of the flue gas channel, constitutes a pressure barrier between the firing space and the withdrawal region of the flue gas channel. In particular, the dynamic pressure in the region of the constriction increases while static pressure falls correspondingly. As a result, large differences in terms of dynamic pressure and static pressure are achieved between the firing space and the transition region of the flue gas channel. This ultimately results in a hydraulic decoupling between the firing space and the withdrawal region of the flue gas channel. It has surprisingly been found that this results in a uniformization of the flow rate of the burner offgases in the flue gas channel. The hydraulic decoupling accordingly makes it possible to achieve asymmetric withdrawal of the burner offgases from the firing space while simultaneously achieving uniform withdrawal of the burner offgases. Complex constructions of the flue gas channel itself (for example as a wedge shape) or different configurations of the individual openings between the firing space and the flue gas channel are thus no longer necessary. Symmetrical withdrawal of the burner offgases, where the burner offgases would need to be withdrawn from two sides via two end openings in the flue gas channel and which entails greater constructional cost and complexity than asymmetrical withdrawal, is not necessary either.

A preferred embodiment of the reformer furnace according to the invention is therefore characterized in that the flue gas channel has only one end opening for withdrawing the burner offgases. This allows purely asymmetrical withdrawal of the burner offgases.

The uniformization of the flow rate of the burner offgases in the withdrawal region in conjunction with the hydraulic decoupling between the firing space and the withdrawal region of the flue gas channel necessarily also results in a uniformization of the flow rate of the burner offgases in the firing space and thus in a uniformization of the temperature distribution in the firing space. This avoids temperature spikes in the reactor tubes which result in an increase in the amount of undesired by-products in the reactor tubes or in premature material failure due to thermal material fatigue.

A preferred embodiment of the reformer furnace according to the invention is characterized in that the channel diameter of the transition region narrows, especially undergoes conical narrowing, from the second end face of the firing space in the direction of the withdrawal region. It is especially provided that the channel diameter of the transition region narrows, especially undergoes conical narrowing, from the second end face of the firing space in the direction of the withdrawal region, and subsequently widens, especially undergoes conical widening, in the direction of the withdrawal region. It is further especially provided that the channel diameter of the transition region narrows, in particular undergoes conical narrowing, from the second end face of the firing space in the direction of the withdrawal region, subsequently has a constant diameter, especially over a certain length, and subsequently widens, especially undergoes conical widening, in the direction of the withdrawal region.

Successive narrowing and/or widening brings about fewer abrupt transitions in the form of, for example, sharp edges, thus producing fewer turbulences from burner offgases at the transitions between the firing space and the transition region of the flue gas tunnel and between the transition region of the flue gas tunnel and the withdrawal region of the flue gas tunnel. This brings about a further uniformization of the flow rate of the burner offgases in the firing space and the withdrawal region of the flue gas tunnel. The abovementioned constructional configurations furthermore have the advantage that loads and forces in the steelwork are passed from the flue gas channel into the firing space therebelow when the flue gas channel is arranged above the firing space of the reformer furnace.

A preferred embodiment of the reformer furnace according to the invention is characterized in that the withdrawal region of the flue gas channel has a constant diameter and/or a constant height over the entire channel length.

The inventive configuration of the flue gas channel having a constricted transition region and the thus-achieved hydraulic decoupling makes it possible for the abovementioned reasons to achieve a geometrically particularly simple configuration of the withdrawal region of the flue gas channel. This especially make it possible for the withdrawal region of the flue gas channel to have a constant height and/or a constant width over the entire length or substantially the entire length, i.e. be constant in diameter. The "entire length" is to be understood as meaning the measured length from one end of the flue channel to the other end, in particular from the closed end to the open end used for withdrawing the burner offgases in the case of asymmetrical withdrawal.

A preferred embodiment of the reformer furnace according to the invention is characterized in that the flue gas channel is in the form of a one-piece construction, wherein the transition region and the withdrawal region of the flue gas channel are joined to one another with a mechanical or atomic-level join.

The flue gas channel is preferably in the form of a one-piece construction in which steel components are joined to one another, for example by welding or another suitable joining method, such that an at least mechanical, or atomic-level, join is achieved between the transition region and the withdrawal region. The steel components are additionally aligned with a refractory material at the required points. In particular the inside of the transition region of the flue gas tunnel is lined with a refractory material, for example an abrasion-resistant concrete.

A preferred embodiment of the reformer furnace according to the invention is characterized in that no internals, in particular no cover slabs provided with means of burner offgas entry in the form of slots, holes, swirl plates or gaps, are provided between the withdrawal region of the flue gas channel and the second end face of the firing space.

No additional internals which would increase the construction cost and complexity during configuration of the flue gas tunnel, or that of the reformer furnace as a whole, are provided at the transition between the firing space and the withdrawal region of the flue gas channel, i.e. in the region of the transition region of the flue gas channel. The hydraulic decoupling between the firing space and the withdrawal region of the flue gas channel is preferably brought about solely by the constricted transition region of the flue gas channel.

A preferred embodiment of the reformer furnace according to the invention is characterized in that the plurality of flue gas channels are provided.

A plurality of flue gas channels may be required depending on the number of burner rows and reaction tube rows comprised by the reformer furnace. The flue gas channels are preferably arranged parallel to one another and spaced apart from one another such that optimal withdrawal of the burner offgases is ensured.

A preferred embodiment of the reformer furnace according to the invention is characterized in that the ratio of the number of flue gas channels to the number of burner rows is 1:1 to 1:4, preferably 1:2 or 1:3, particularly preferably 1:3.

The hydraulic decoupling between the withdrawal region of the flue gas channel and the firing space makes it possible for the first time to withdraw from the reformer furnace the burner offgases from more than one burner row through only a single flue gas channel. It is preferable to employ one flue gas channel per two or three burner rows, particularly preferably one flue gas channel per three burner rows. If fewer flue gas channels than burner rows are required this considerably simplifies the construction of the reformer furnace, for example in respect of the demands placed on the steelwork.

A preferred embodiment of the reformer furnace according to the invention is characterized in that the first end face of the firing space and the burners are arranged at the bottom and the second end face of the firing space and the flue gas channel are arranged at the top, wherein the burners produce upwardly oriented flames. In this embodiment the hot burner offgases ascend from bottom to top by convection and thus increase the pressure on the second end face, thus resulting in a further improved pressure decoupling or hydraulic decoupling between the withdrawal region and the firing space via the constriction (transition region) of the flue gas channel.

In certain embodiments of reformer furnaces it is not possible for the so-called convection zone, which constitutes the region of thermal recovery from the burner offgases, to be placed on the firing space. This is the case when the convection zone is too large or too heavy or when a complicated interconnection of heat exchangers would be required, a high degree of air preheating would be required or, for example, additional blowers would need to be installed. In such a case the flue gas channels are arranged above the firing space, so that the convection zone may preferably be placed next to the reformer furnace at the open end of the flue gas channels.

A preferred embodiment of the reformer furnace according to the invention is characterized in that a feed for the gaseous input material and a discharge for the reaction product of the endothermic process are each arranged at the bottom end of a reaction tube.

In this embodiment the inner regions of the reaction tubes are configured such that both the reactant gas feed and the product gas discharge are arranged on the same side of a reaction tube. In this case the reactant gas is mixed with process steam, passed through the catalyst tubes of the reformer and subsequently cooled internally by the heat exchange with process gases in the tubes. Arrangement of the reactant gas feed and the product gas discharge on the same side of the reaction tubes simplifies the constructional configuration of the reformer furnace especially when the first end face of the firing space and the burners are arranged at the bottom and the second end face of the firing space and the flue gas channel are arranged at the top, wherein the burners produce upwardly oriented flames.

It may alternatively also be provided in advantageous and construction-simplifying fashion that a feed for the gaseous input material and a discharge for the reaction product of the endothermic process are each arranged at the top end of a reaction tube and the first end face of the firing space and the burners are arranged at the top and the second end face of the firing space and the flue gas channel are arranged at the bottom, wherein the burners produce downwardly oriented flames.

A preferred embodiment of the reformer furnace according to the invention is characterized in that the ratio of the height of the transition region to the height of the withdrawal region of the flue gas channel is 1:1 to 5:1, preferably 1.5:1 to 3:1 and particularly preferably 2:1.

The hydraulic decoupling between the firing space and the withdrawal region of the flue gas channel has the result that the transition region of the flue gas channel may in principle have any desired height, i.e. the distance between the second end face of the firing space and the withdrawal zone may have any desired length provided the absolute pressure drop over the length of this sector does not exceed a particular threshold value. This affords further possibilities for constructional variation since the less wide, i.e. narrower, transition region affords free space in this region which may be utilized by other external components, feed conduits and more.

The objects of the invention are moreover at least partially achieved by the use of a reformer furnace according to the invention for producing synthesis gas from a carbon-containing input material, in particular natural gas.

EXAMPLE

The invention is hereinbelow more particularly elucidated by an exemplary embodiment. In the following detailed description of the exemplary embodiment, reference is made to the accompanying figures which form a part thereof and which contain illustrative representations of specific embodiments of the invention. In this connection, direction-specific terminology such as "top", "bottom", "front", "back" etc. is used with reference to the orientation of the described figure(s). Since components of embodiments may be positioned in a multiplicity of orientations, the direction-specific terminology is used for elucidation and is in no way limiting. A person skilled in the art will appreciate that other embodiments may be used and structural or logical changes may be undertaken without departing from the scope of protection of the invention. The following detailed description is therefore not to be understood in a limiting sense and the scope of protection of the embodiments is defined by the accompanying claims. Unless otherwise stated the drawings are not to scale,

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
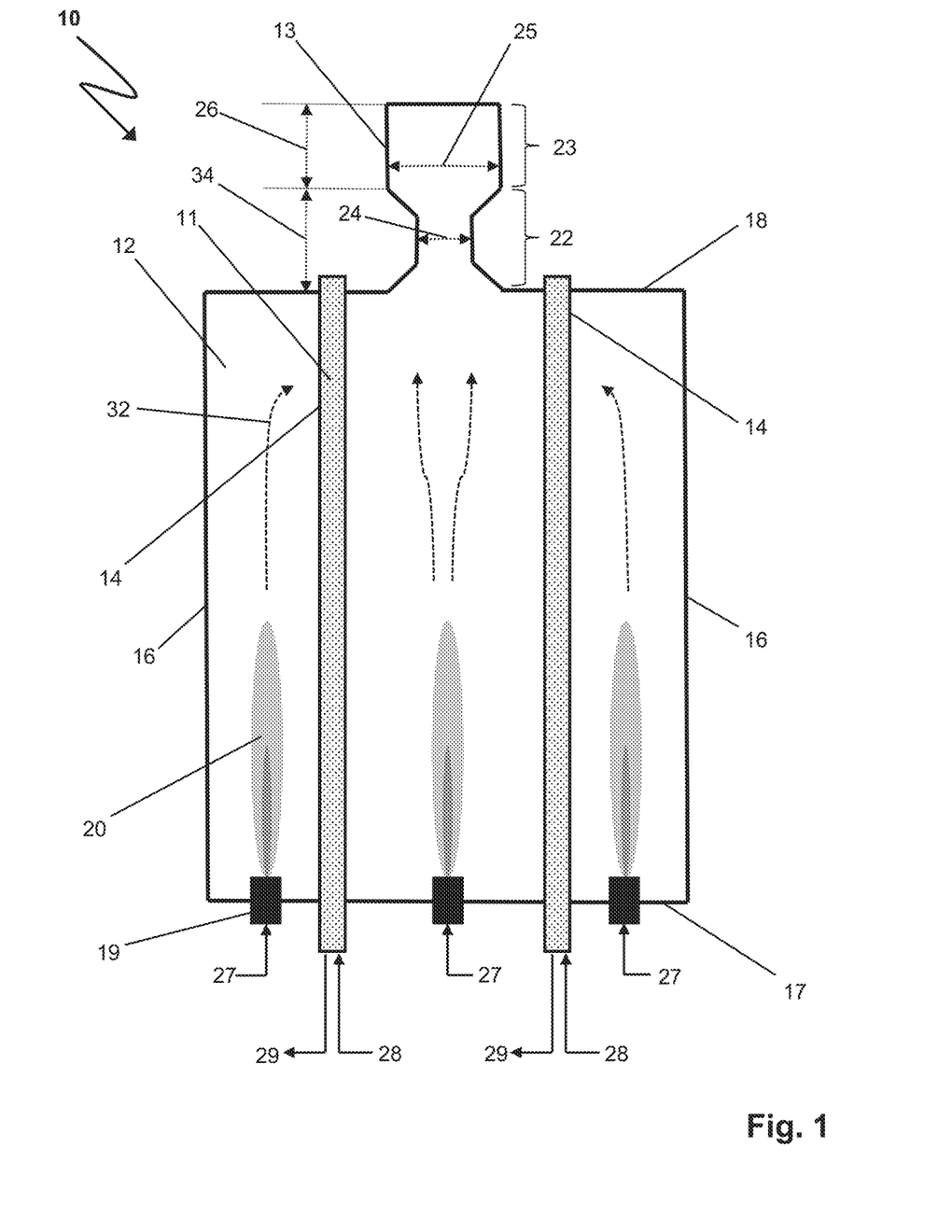
FIG. 1 shows a simplified representation of a cross section through an inventive reformer furnace in a front view.
Figure 2:
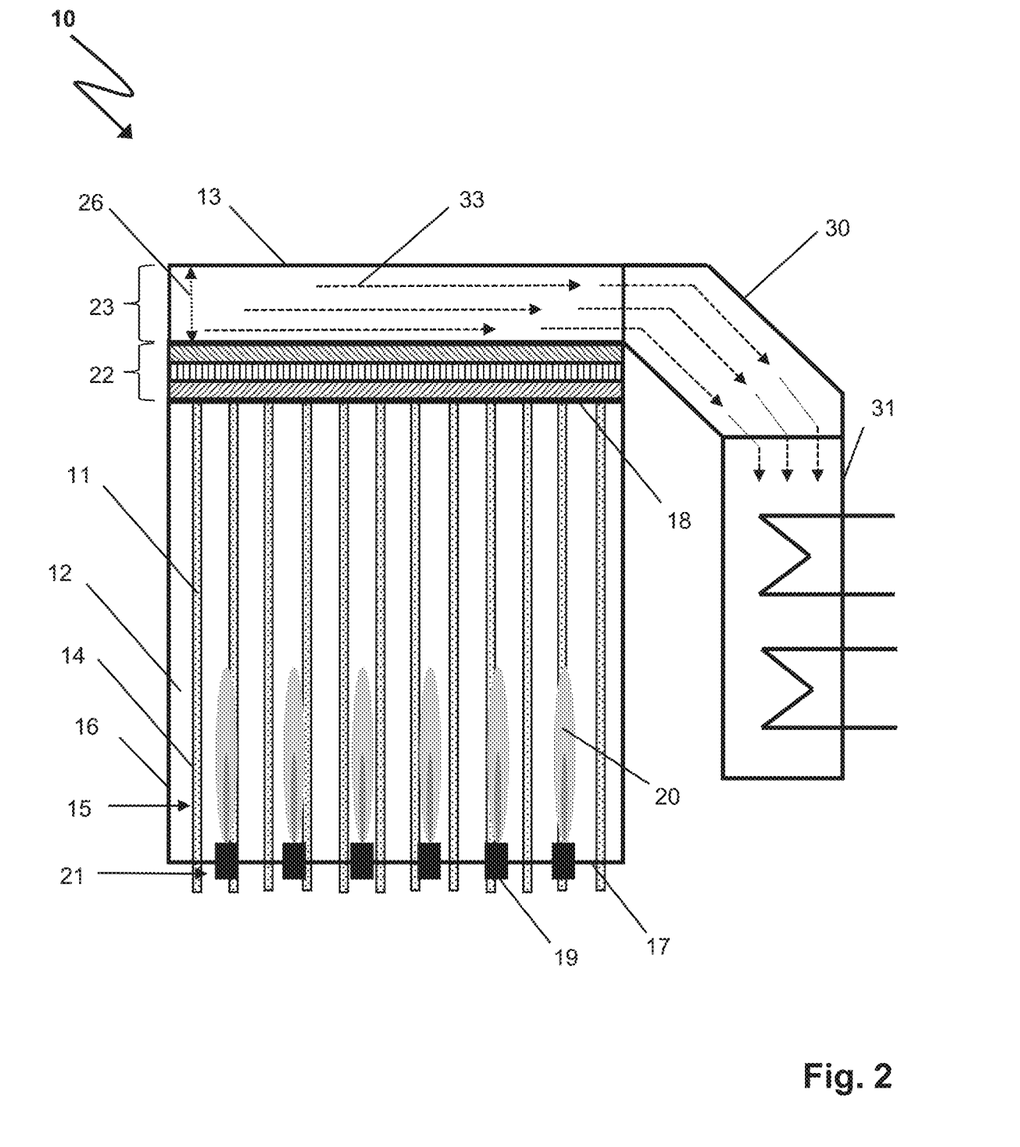
FIG. 2 shows a cross section of the same inventive reformer furnace in a side view and FIG. 3a shows a different embodiment of the inventive flue gas tunnel having a transition region and a withdrawal region.

In the side view according to FIG. 2 the burner rows 21, formed by the burners 19 and reaction tubes 14, and the reaction tube rows 15 run in the plane of the drawing. Accordingly, the flue gas tunnel 13 extends in the plane of the drawing. In the front view according to FIG. 1 the inventive reformer furnace 10 is rotated by 90 degrees and the burner rows 21 and the reaction tube rows 15 would therefore project from the plane of the drawing and the flue gas tunnel 13 would extend out of the plane of the drawing.

The reformer furnace 10 according to FIG. 1 comprises a plurality of reaction tubes 14 filled with a catalyst, for example in the form of pellets, tablets, shaped articles or a structured (monolithic) packing. The catalyst may be for example a nickel-based catalyst for steam reforming of natural gas to produce synthesis gas. The reaction tubes are vertically arranged and extend through the entirety of the firing space 12 of the reformer furnace 10. In the case of the reformer furnace 10 of FIG. 1 the reaction tubes 14 are arranged in two reaction tube rows 15. The row arrangement is elucidated by the representation of FIG. 2, but the cross sectional representation of FIG. 2 means that only one of the two reaction tube rows 15 is shown. The sum of the interiors of the reaction tubes 14 form the reaction space 11 of the reformer furnace 10, wherein this reaction space is spatially separated from the firing space 12 by the walls of the reaction tubes. The reaction tubes 14 each have on their underside a reactant gas feed 28, for example for supplying natural gas and steam, and a product gas discharge 29, for example for discharging synthesis gas. The interior of the reaction tubes is accordingly configured such that the reactant gas may be supplied on the same side as the product gas is withdrawn.

The firing space 12 is formed by a plurality of refractory walls 16 and a first end face 17 and a second end face 18. The two end faces 17 and 18 are likewise configured as refractory walls. Arranged at the first end face 17 are burners 19 which produce flames 20 oriented vertically upwards in the direction of the second end face. The burners 19 are arranged in three burner rows 21 as is apparent from FIG. 2. The burners 19 of the left-hand and right-hand burner row 21 according to FIG. 1 are the wall-adjacent burners which fire the reaction tube rows 15 arranged on the right-hand and left-hand side of these burners respectively. The burners 19 arranged in the middle according to FIG. 1 form a non-wall-adjacent burner row 21, wherein these burners fire reaction tube rows 15 arranged on the left-hand and right-hand side thereof. Each burner has a gas supply 27 for supplying fuel and oxygen (from air).

A flue gas channel 13 for withdrawing the burner offgases from the burners 19 is in fluid connection with the firing space 12 and is arranged in the region of the second end face 18 of the reformer furnace. The flue gas channel 13 has a transition region 22 and a withdrawal region 23, wherein both regions are directly connected to one another. The flue gas channel 13 is connected to the second end face 18 via the transition region 22. The transition region 22 of the flue gas channel has a reduced channel diameter 24 compared to the channel diameter 25 of the withdrawal region 23. The channel diameter 24 of the transition region is the smallest channel diameter of the transition region. Due to the rectangular basic shape of the withdrawal region the channel diameter 25 of the withdrawal region 23 is constant over the entire height 26 of the withdrawal region. The same applies to the height 26 of the withdrawal region 23 which is constant over the entire length of the flue gas channel as is apparent in the side view according to FIG. 2.

Due to the reduced channel diameter 24 of the transition region 22 the flue gas tunnel 13 has a constriction in the region of the transition region 22 which ultimately has the result that the firing space 12 is hydraulically decoupled from the withdrawal region 23 of the flue gas tunnel 13. The hydraulic decoupling between the withdrawal region 23 and the firing space 12 has the result that the burner offgases 32 (indicated by dashed arrows) in the region of the firing space 12 have a uniform flow rate upon withdrawal from this firing space 12. This also uniformized the flow rates of the burner offgases 33 in the withdrawal region 23 of the flue gas tunnel 13.

In the example of FIGS. 1 and 2 the ratio of the channel diameter 24 of the transition region to the channel diameter 25 of the withdrawal region is 1:6. The transition region may in principle have a "long" configuration, i.e. the height 34 of the transition region 22 may assume a large value compared to the height 26 of the withdrawal region. In the present example the ratio of the height 34 to the ratio of the height 26 is 1:2.

The transition region 22 initially undergoes conical narrowing from the second end face 18 in the direction of the withdrawal region 23, subsequently exhibits a constant channel diameter 24 over a certain length and then undergoes conical widening in the direction of the withdrawal region 23 before opening into the withdrawal region which in turn has a constant channel diameter 25. The conical narrowing, the constant region and the conical widening of the transition region 22 are indicated by differently shaded areas in FIG. 2.

The flue gas channel 13 is closed at one of its ends and at its open end opens into a flue gas tunnel transition 30, which in turn opens into the thermal recovery zone 31.

The reformer furnace 10 altogether comprises three burner rows 21 and two reaction tube rows 15 but only a single flue gas tunnel 13 for withdrawing the burner offgases 32 from the burners 19 of the three burner rows 21. The ratio of the number of burner rows 21 to the number of flue gas tunnels 13 is thus three to one in the example of FIGS. 1 and 2. This high ratio is made possible by the hydraulic decoupling between the firing space 12 and the withdrawal region 23. The use of only a single flue gas tunnel for three burner rows considerably simplifies the construction of the reformer furnace 10.

FIGS. 3a to 3d depict different embodiments of the inventive flue gas channel 13 having a transition region 22 and a withdrawal region 23. The figures each show the flue gas channel 13 in cross section, connected to the second end face 18 which is only partially depicted. Also shown are the channel diameters 25 of the withdrawal region, the channel diameters of the transition region 24, the heights 26 of the withdrawal region and the heights 34 of the transition region. In all four cases of FIGS. 3a to 3d the withdrawal region 23 has a rectangular cross section of constant height 26.

Figure 3A:
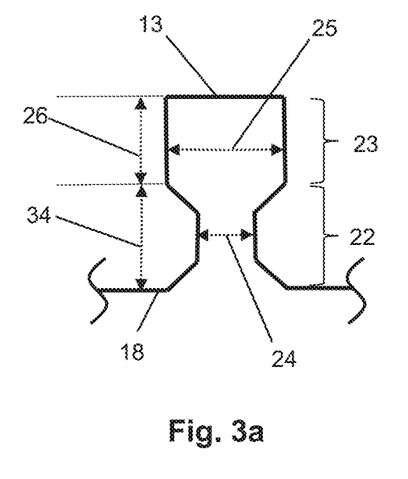

The flue gas channel 13 according to FIG. 3a corresponds in its configuration to the configuration of the flue gas channel according to FIGS. 1 and 2. The transition region 22 of the flue gas channel 13 according to FIG. 3a is configured as a double cone having a straight intermediate piece, wherein the diameter of the double cone initially undergoes linear narrowing from the second end face 18 in the direction of the withdrawal region until the channel diameter 24 at the narrowest point of the double cone is achieved, then over a certain length has a constant diameter corresponding to the channel diameter 24 of the transition region and subsequently undergoes linear widening in the direction of the withdrawal region before transitioning into the withdrawal region.

Figure 3B:
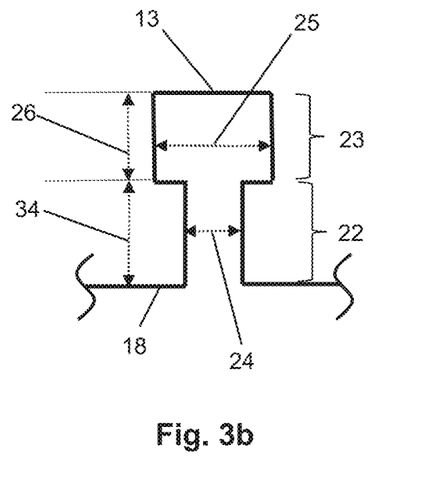
FIG. 3b shows a different embodiment of the inventive flue gas tunnel having a transition region and a withdrawal region.

The transition region 22 of the flue gas channel 13 according to FIG. 3b has a constant channel diameter 24 over the entire height 24.

Figure 3C:
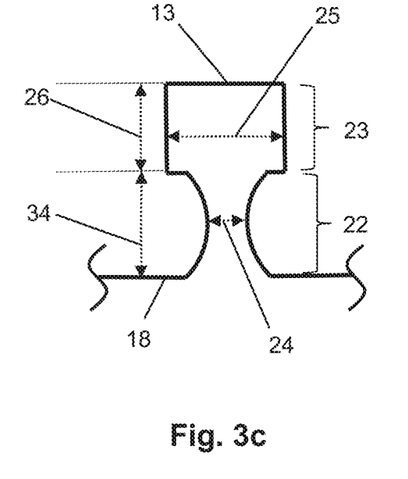
FIG. 3c shows a different embodiment of the inventive flue gas tunnel having a transition region and a withdrawal region.
Figure 3D:
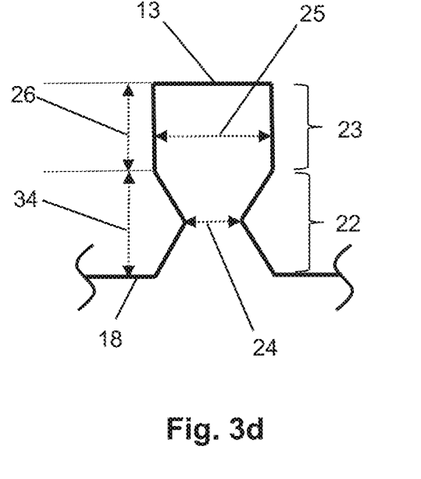
FIG. 3d shows a different embodiment of the inventive flue gas tunnel having a transition region and a withdrawal region.

The transition region 22 of the flue gas channel 13 according to FIG. 3c is configured as a rotational body symmetrical about its longitudinal axis, wherein the diameter of the rotational body initially undergoes parabolic narrowing from the second end face 18 in the direction of the withdrawal region until the channel diameter 24 at the vertex of the parabola is achieved and subsequently undergoes parabolic widening in the direction of the withdrawal region before transitioning into the withdrawal region, The transition region 22 of the flue gas channel 13 according to FIG. 3d is configured as a double cone, wherein the diameter of the double cone initially undergoes linear narrowing from the second end face 18 in the direction of the withdrawal region until the channel diameter 24 at the narrowest point of the double cone is achieved and subsequently undergoes linear widening in the direction of the withdrawal region before transitioning into the withdrawal region.

LIST OF REFERENCE NUMERALS

- 10 Reformer furnace
- 11 Reaction space
- 12 Firing space
- 13 Flue gas channel
- 14 Reaction tube
- 15 Reaction tube row
- 16 Refractory wall
- 17 First end face
- 18 Second end face
- 19 Burner
- 20 Flame
- 21 Burner row
- 22 Transition region of the flue gas channel
- 23 Withdrawal region of the flue gas channel
- 24 Transition region channel diameter
- 25 Withdrawal region channel diameter
- 26 Height of withdrawal region
- 27 Burner gas feed
- 28 Reactant gas feed
- 29 Product gas discharge
- 30 Flue gas tunnel transition
- 31 Thermal recovery zone
- 32 Burner offgases
- 33 Burner offgases
- 34 Height of transition region It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above,

What is claimed is:

1. A reformer furnace for performing an endothermic process, comprising
    a reaction space, a firing space and a flue gas channel in fluid connection with the firing space; wherein
    the reaction space is formed by a plurality of vertical reaction tubes passing through the firing space,
    wherein the reaction tubes comprise in the tube interior a catalyst for converting a gaseous input material,
    wherein the reaction tubes are arranged in line and form one or more reaction tube rows; and
    wherein the firing space is formed by a plurality of refractory walls, comprises a first end face and a second end face and
    the firing space comprises a plurality of burners arranged at the first end face which produce flames oriented in the direction of the second end face,
    wherein the burners are arranged in line and form a plurality of burner rows,
    wherein a burner row for firing the reaction tubes is arranged parallel to a reaction tube row; and
    wherein the flue gas channel for withdrawing burner offgases is arranged in the region of the second end face of the firing space and runs parallel to the burner rows and outside the firing space,
    wherein the flue gas channel has a transition region and a withdrawal region, wherein the flue gas channel is connected to the second end face of the firing space via the transition region and the transition region of the flue gas channel has a reduced channel diameter compared to the withdrawal region of the flue gas channel, and is thus configured to produce a pressure barrier and decouple the firing space from the withdrawal region and configured to produce a uniform flowrate upon removal from the firing space, and
    wherein each flue gas channel withdraws offgasses from three burner rows and two reaction tube rows.

2. The reformer furnace according to claim 1, wherein the ratio of the channel diameter of the transition region to the channel diameter of the withdrawal region is 1:2 to 1:10.

3. The reformer furnace according to claim 1, wherein the smallest channel diameter of the transition region is smaller than the largest channel diameter of the withdrawal region.

4. The reformer furnace according to claim 1, wherein the channel diameter of the transition region narrows from the second end face of the firing space in the direction of the withdrawal region.

5. The reformer furnace according to claim 4, wherein the channel diameter of the transition region narrows from the second end face of the firing space in the direction of the withdrawal region and subsequently widens in the direction of the withdrawal region.

6. The reformer furnace according to claim 5, wherein the channel diameter of the transition region narrows from the second end face of the firing space in the direction of the withdrawal region, subsequently has a constant diameter and subsequently widens in the direction of the withdrawal region.

7. The reformer furnace according to claim 1, wherein the withdrawal region of the flue gas channel has a constant diameter and/or a constant height over the entire channel length.

8. The reformer furnace according to claim 1, wherein the flue gas channel is in the form of a one-piece construction, wherein the transition region and the withdrawal region of the flue gas channel are joined to one another with a mechanical or atomic-level join.

9. The reformer furnace according to claim 1, wherein no cover slabs provided with means of burner offgas entry in the form of slots, holes, swirl plates or gaps, are provided between the withdrawal region of the flue gas channel and the second end face of the firing space.

10. The reformer furnace according to claim 1, wherein the first end face of the firing space and the burners are arranged at the bottom and the second end face of the firing space and the flue gas channel are arranged at the top, wherein the burners produce upwardly oriented flames.

11. The reformer furnace according to claim 10, wherein a feed for the gaseous input material and a discharge for the reaction product of the endothermic process are each arranged at the bottom end of a reaction tube.

12. The reformer furnace according to claim 1, wherein the ratio of the height of the transition region to the height of the withdrawal region of the flue gas channel is 1:1 to 5:1.

* * * * *